US011920775B1

(12) United States Patent
Bruger

(10) Patent No.: US 11,920,775 B1
(45) Date of Patent: Mar. 5, 2024

(54) 360 DEGREE HOLLOW LIGHT

(71) Applicant: Digital Twin Marine, Inc., Fort Lauderdale, FL (US)

(72) Inventor: Thomas E Bruger, North Palm Beach, FL (US)

(73) Assignee: DIGITAL TWIN MARINE, INC., Fort Lauderdale, FL (US)

( * ) Notice: Subject to any disclaimer, the term of this patent is extended or adjusted under 35 U.S.C. 154(b) by 0 days.

(21) Appl. No.: 18/158,324

(22) Filed: Jan. 23, 2023

(51) Int. Cl.
*F21V 3/04* (2018.01)
*F21V 21/06* (2006.01)
*F21V 23/06* (2006.01)
*F21V 33/00* (2006.01)

(52) U.S. Cl.
CPC .............. *F21V 3/049* (2013.01); *F21V 21/06* (2013.01); *F21V 23/06* (2013.01); *F21V 33/0052* (2013.01)

(58) Field of Classification Search
CPC .......... F21V 3/049; F21V 21/06; F21V 23/06; F21V 33/0052
See application file for complete search history.

(56) References Cited

U.S. PATENT DOCUMENTS 5,055,646 A * 10/1991 Byrum .................... F21V 23/04 200/275
6,245,229 B1 * 6/2001 Kool ......................... C02F 9/20 220/756
9,170,006 B2 10/2015 Cugini et al.
10,132,488 B1 11/2018 Waldon
10,295,888 B2 5/2019 Brunt
11,293,622 B2 4/2022 Bu et al.
11,339,930 B1 5/2022 Workman
2014/0240969 A1 * 8/2014 Chen ..................... F21V 14/065 362/187

(Continued)

FOREIGN PATENT DOCUMENTS

CN 107896301 A 4/2018
CN 108954034 A 12/2018

(Continued)

OTHER PUBLICATIONS

Bushman Panoramic, https://bushman-panoramic.com/product/halo-360-light/, “HALO 360 LIGHT,” Czech Republic, 2022.

(Continued)

*Primary Examiner* — Evan P Dzierzynski
(74) *Attorney, Agent, or Firm* — Greenberg Traurig, LLP; Mammen (“Roy”) P. Zachariah

(57) ABSTRACT

A lighting device is disclosed. The lighting device includes a core body that is shaped such that a light emitting diode sheet may be wrapped around the surface of the core body. A groove of a bottom housing of the lighting device is secured to a bottom portion of the core body and a groove of a top housing is secured to a top portion of the core body. The lighting device includes a hollow cavity extending from the bottom housing into the core body. The hollow cavity may be positioned over a portion of a tripod or mount, and a clamp is utilized to secure the lighting device to the tripod or mount. The lighting device may be activated, thereby causing a plurality of light emitting diodes of the light emitting diode sheet to emit light 360 degrees outwards from the core body of the lighting device.

20 Claims, 15 Drawing Sheets

(56) References Cited

U.S. PATENT DOCUMENTS

| | | | | |
|---|---|---|---|---|
| 2014/0369038 | A1* | 12/2014 | Tischler | F21L 4/00 362/249.08 |
| 2017/0146198 | A1 | 5/2017 | Nielson-Williams | |
| 2018/0101088 | A1 | 4/2018 | Robinson | |
| 2018/0136544 | A1 | 5/2018 | Mink | |
| 2019/0383468 | A1* | 12/2019 | Ang | F21V 7/041 |
| 2022/0055806 | A1* | 2/2022 | Yoshida | B65D 50/043 |

FOREIGN PATENT DOCUMENTS

| | | | |
|---|---|---|---|
| CN | 109185722 | A | 1/2019 |
| CN | 109373237 | A | 2/2019 |
| CN | 209327751 | U | 8/2019 |
| CN | 114151770 | A | 3/2022 |
| DE | 102006042022 | A1 | 3/2008 |
| EP | 2568330 | A2 | 12/2013 |
| JP | 2009186943 | A | 8/2009 |
| JP | 2017068160 | A | 4/2017 |
| KR | 20170079407 | A | 7/2017 |
| KR | 20180114476 | A | 10/2018 |
| RU | 210085 | U1 | 3/2022 |

OTHER PUBLICATIONS

"DUNWELL Vertical360 LED Work Light "2200 Lumens" Portable Work Light with 360 All-Around Brightness" Collapsible, Standing LED Light Ideal for Garages, Shops, Attics & More amazon.com (Jan. 28, 2021) https://www.amazon.com/DUNWELL-VERTICAL360-Work-Light-LUMENS/dp/B08V9HZ47P?th=1 Discloses an LED work light featuring a 360-degree illumination, frosted lens, and metal tripod framework.

"Custom Dynamics Truwrapz LED Fork Turn Signal—49mm—Smoke TW49AS" www.amazon.com (Nov. 16, 2011) https://www.amazon.com/Custom-Dynamics-Truwrapz-Fork-Signal/dp/B0067EXIAC Discloses an LED motorcycle fork wrap-around light.

"MAXI LED Balloon Light" yuanglight.com (Aug. 9, 2020) https://yuanglight.com/maxi-led-balloon-light/ Discloses an LED balloon light for 360-degree illumination.

"Bar Light Tube Lighting For Green Screen or 360-degree Photo Booth (1pc)" www.etsy.com (Jan. 2, 2022) https://www.etsy.com/listing/1117701006/bar-light-tube-lighting-for-green-screen?gpla=1&gao=1&&utm_source=google&utm_medium=cpc&utm_campaign=shopping_us_a-paper_and_party_supplies-party_supplies-party_decor-backdrops_and_props&utm_custom1=_k_EAlalQobChMloYW6woWs-QIVawilCR04zgNjEAwYASABEgJpb_D_BwE_k_&utm_content=go_12569673578_121242778764_507344140761_pla-QIZawiICR04zgNjEAqYASABEgJpb_D_Bwe. Discloses a bar light featuring a rechargable LED light.

"Telescoping LED All-Round Navigation Pole Light" www.westmanne.com (2013) https://www.westmarine.com/west-marine-telescoping-led-all-round-navigation-pole-light-13022181.html?gclid=EAlalQobChMIwNnrylqs-QIVTcmUCR13fAapEAQYFiABEgJVdfD_BWE Discloses an all round LED nav light featuring a telescoping pole.

* cited by examiner

360 DEGREE HOLLOW LIGHT

FIELD OF THE INVENTION

The present application relates to lighting technologies, camera and photography technologies, and mounting and stand technologies, and, more particularly, to a 360 degree hollow light and accompanying methods for utilizing the 360 degree hollow light, such as in the context of photography and laser scanning.

BACKGROUND

In today's technologically-advanced society, numerous types of complex cameras have been developed to generate very high quality images, video content, audio content, among other types of content. Additionally, laser scanning technologies, such as light detection and ranging ("LiDAR"), have been developed and utilized to generate 3-dimensional (3D) representations of areas and objects in various environments. For LiDAR, a laser of a laser scanner may be utilized to scan a targeted object and/or environment and measure the amount of time it takes for the laser light from the objects in the environment to return to the receiver of the laser scanner. Using the measurements, the LiDAR scanner may generate a 3D-representation of the targeted object, environment, or both, and a distance map of the objects contained within the environment. In order to capture high quality content and representations, users of cameras and laser scanning technologies often utilize various types of accessories to increase the likelihood of capturing and/or generating such content and representations. Users, for example, may utilize accessories, such as, but not limited to, stands, mounts, tripods, supplemental lighting, attachments, or a combination thereof.

In certain environments, the effectiveness of such accessories are even more critical in generating the optimal photos, videos, and/or representations. Such environments may include, but are not limited to, dark environments, undersea environments, container environments, interiors of ships, warehouses, caves, among other environments. Capturing photos and videos and generating 3-D representations with LiDAR in such environments is often difficult due to low or non-existing lighting. In such scenarios, users may utilize various combinations of stands, mounts, and supplemental lighting to illuminate the area in which they want to capture photos and videos or generate representations. Notably, however, currently existing types of supplemental lighting are often ineffective in fully illuminating the target area and often result in shadows being cast on certain areas of the target area, certain areas of the target area being partially illuminated, and remaining areas being fully illuminated. Additionally, currently existing types of supplemental lighting often fail to evenly cast light on the target area or subject in the area. As a result, images, videos, and representations generated by cameras and laser scanners may not include the entirety or the full detail of the objects and the area in which the objects reside. Still further, it is often difficult to hide supplemental lighting and/or devices from appearing in the images or videos, particularly when using a 360 degree camera.

As a result, there remains room for substantial enhancements to existing lighting technologies. While currently existing lighting technologies provide for various benefits, such technologies still come with various drawbacks and inefficiencies, as indicated above. Based at least on the foregoing, new lighting technologies may be provided that facilitate higher quality lighting for generating images, videos, and representations, while also reducing or eliminating the negative effects of existing lighting technologies. Such new lighting technologies may facilitate the generation of enhanced images and videos, improved 3-D representations, enhanced versatility, greater stability, and increased ease-of-use.

SUMMARY

A lighting device and accompanying methods for utilizing a lighting device are disclosed. In particular, embodiments of the lighting device disclosed herein provide up to 360 degree lighting for use with cameras, LiDAR, and/or any other technologies for generating images, videos, representations, or a combination thereof. In certain embodiments, the lighting device may be configured to include a core body, a top housing configured to secure to a top portion of the core body, a bottom housing configured to secure to a bottom portion of the core body, a light emitting diode sheet including a plurality of light emitting diodes wrapped around a surface of the core body, a diffuser casing to facilitate diffusion of light emitted by the light emitting diodes, and a plurality of other componentry. In certain embodiments, the lighting device may include a hollow cavity, which may extend through a portion of the bottom housing and the core body. In certain embodiments, the hollow cavity may be configured to be positioned over a portion of a mount, tripod, and/or other accessory. When the hollow cavity of the lighting device is positioned over the portion of the mount, tripod, and/or other accessory such that the portion of the mount, tripod, and/or other accessory resides within the hollow cavity, a clamp may be utilized to secure the lighting device to the mount, tripod, and/or other accessory device. In certain embodiments, the clamp may be utilized to adjust the position of the lighting device with respect to the mount, tripod, and/or other accessory.

Once the lighting device is secured to the mount, tripod, and/or other accessory, a user may then secure a camera, laser scanner, or any other device to the lighting device. For example, in certain embodiments, the camera, laser scanner, or other device may be secured to a top portion of the top housing of the lighting device or to an attachment secured to the top housing of the lighting device. In certain embodiments, a user may activate the lighting device, thereby causing the plurality of light emitting diodes to emit light in a plurality of directions. In certain embodiments, for example, the light may be emitted 360 degrees from the core body of the lighting device. The light may be utilized to illuminate a target area and/or object located in an environment. The user may activate the camera, scanner or other device and may then proceed to capture image content, video content, and/or other information associated with a target area and/or object located in an environment.

In certain embodiments, a lighting device is provided. The lighting device, in certain embodiments, may include a top housing comprising a first top housing groove, a bottom housing comprising a first bottom housing groove, and a core body. In certain embodiments, the core body may include a first core body groove located on a top portion of the core body that is configured to secure to the first top housing groove of the top housing. Additionally, the core body may include a second core body groove on a bottom portion of the core body configured to secure to the first bottom housing groove of the bottom housing. In certain embodiments, the core body may include a hollow cavity extending within the core body. In certain embodiments, the hollow cavity may extend partially within the core body, however, in certain embodiments, the hollow cavity may extend an entire length of the core body. In certain embodiments, the lighting device may include a light emitting diode sheet configured to wrap around a portion of the core body of the lighting device. In certain embodiments, the light emitting diode sheet may include a plurality of light emitting diodes and may be configured to emit light in a plurality of directions. In certain embodiments, the lighting device may also include a diffuser casing configured to cover the light emitting diode sheet and configured to be secured to the lighting device between the top housing and the bottom housing.

In certain embodiments, a lighting device system is disclosed. In certain embodiments, the lighting device system may include a lighting device that may include a plurality of componentry. In certain embodiments, the lighting device may include a top housing including a first top housing groove, a bottom housing including a first bottom housing groove, and a core body. In certain embodiments, the core body may include a first core body groove on a top portion of the core body configured to secure to the first top housing groove of the top housing, and a second core body groove on a bottom portion of the core body configured to secure to the first bottom housing groove of the bottom housing. In certain embodiments, the core body may include a hollow cavity extending within the core body. In certain embodiments, the lighting device may include a light emitting diode sheet configured to wrap around a portion of the core body. In certain embodiments, the light emitting diode sheet may include a plurality of light emitting diodes and may be configured to emit light in a plurality of directions, including in 360 degrees. In certain embodiments, the lighting device system may include tripod or mount, and the hollow cavity of the core body may be configured to be positioned over a portion of the tripod or mount. In certain embodiments, the lighting device system may include a clamp configured to secure the tripod or mount to the lighting device after the hollow cavity of the core body is positioned over the portion of the tripod or mount.

In certain embodiments, a method for assembling and utilizing a lighting device is disclosed. In certain embodiments, the method may include securing a bottom housing of a lighting device to a core body of the lighting device. In certain embodiments, the method may include wrapping a light emitting diode sheet comprising a plurality of light emitting diodes around a surface of the core body. In certain embodiments, the method may include positioning a diffuser casing over a top portion of the core body until the diffuser casing contacts the bottom housing of the lighting device. In certain embodiments, the method may include securing a top housing of the lighting device to top portion of the core body of the lighting device. In certain embodiments, the method may include positioning a cavity of the lighting device over a portion of a tripod or mount. In certain embodiments, the method may include securing the lighting device to the portion of the tripod or mount via a clamp. In certain embodiments, the method may include activating the light emitting diode sheet such that the plurality of light emitting diodes emit light 360 degrees outwards from core body of the lighting device. In certain embodiments, the method may include generating content in an environment via a camera or scanning in the environment via a scanner secured to the lighting device, the tripod or mount, or a combination thereof.

These and other features of the lighting device and methods of assembling and utilizing the lighting device are described in the following detailed description, drawings, and appended claims.

DETAILED DESCRIPTION

Figure 1:
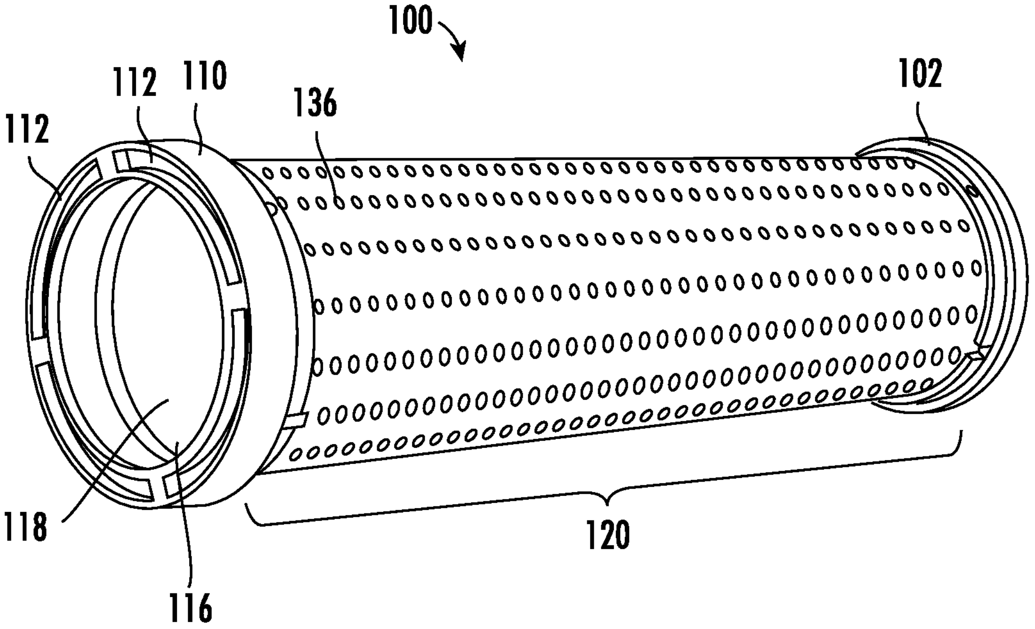
FIG. 1 is a schematic diagram of an exemplary lighting device in an inactivated state according to embodiments of the present disclosure.
Figure 2:
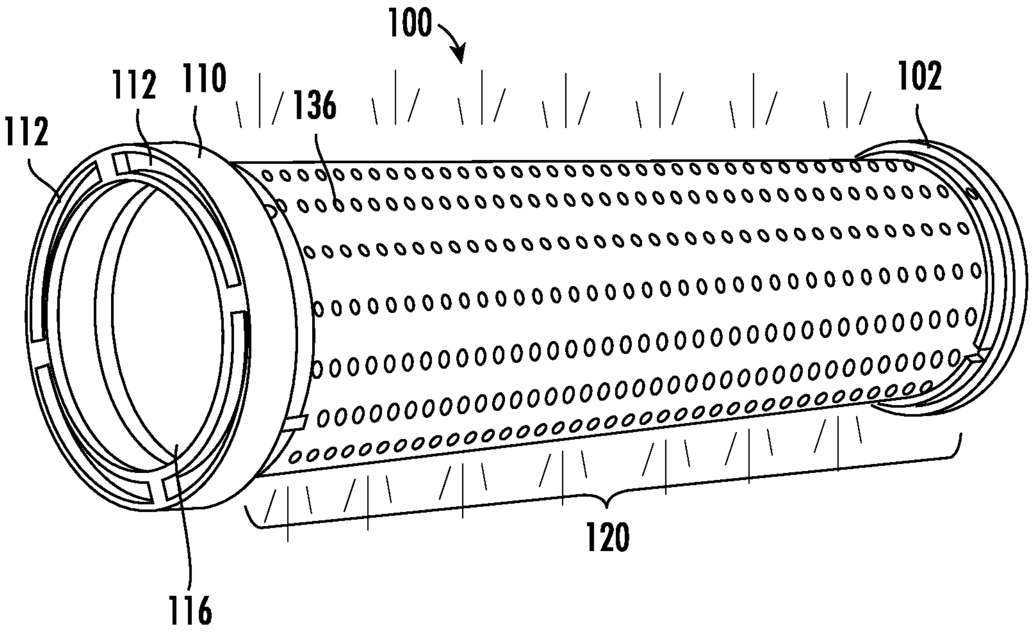
FIG. 2 is a schematic diagram of the exemplary lighting device of FIG. 1 in an activated state according to embodiments of the present disclosure.
Figure 3:
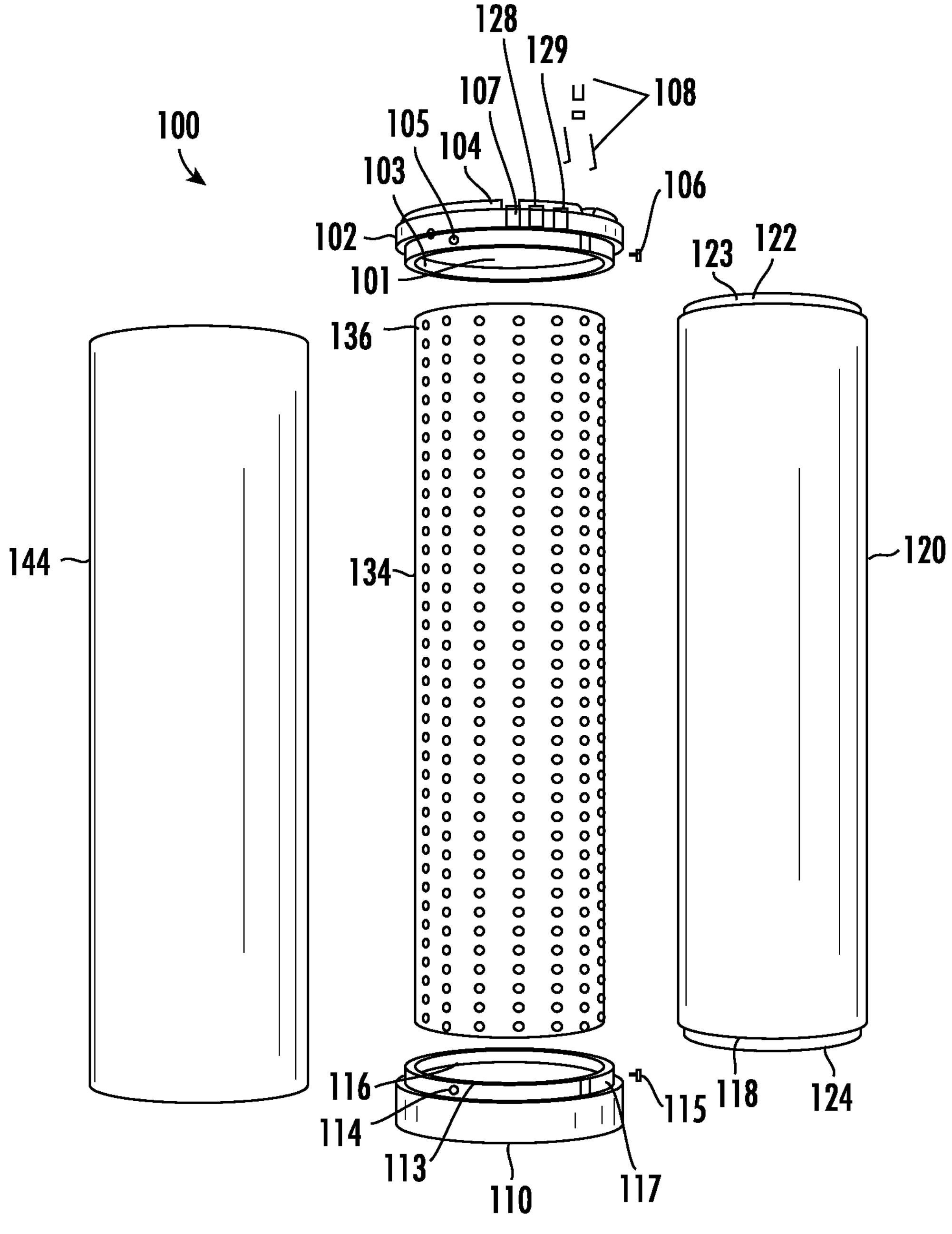
FIG. 3 is a schematic diagram featuring an exploded view of an exemplary lighting device according to embodiments of the present disclosure.

Lighting devices (e.g., lighting devices 100, 1370) and accompanying methods (e.g., method 1400) for utilizing a lighting device are disclosed. In particular, embodiments of the lighting device disclosed herein provide up to 360 degree lighting for use with cameras, LiDAR, and/or any other technologies for generating images, videos, representations, or a combination thereof. In certain embodiments, the lighting devices described herein may serve as supplemental lighting for such cameras, laser scanners, and/or other technologies. The lighting devices described herein are configured work with existing accessories for such cameras, laser scanners, and/or other devices. For example, the lighting devices of the present disclosure are configured to slide over componentry of an existing camera mount or tripod, while simultaneously allowing the user to depend on their typical gear to support the user's camera, laser scanner, or other device. Additionally, high quality cameras and laser scanners are often expensive, and such cameras and laser scanners are configured to readily secure to the lighting devices of the present disclosure to increase stability and to reduce the possibility of damage.

In certain embodiments, an exemplary lighting device of the present disclosure may be configured to include a core body, a top housing configured to secure to a top portion of the core body, a bottom housing configured to secure to a bottom portion of the core body, a light emitting diode sheet including a plurality of light emitting diodes wrapped around a surface of the core body, a diffuser casing to facilitate diffusing of light emitted by the light emitting diodes, and a plurality of other componentry. In certain embodiments, the lighting device may include a hollow cavity, which may extend through a portion of the bottom housing and the core body. In certain embodiments, the hollow cavity may be configured to be positioned over a portion (e.g., a column or other component) of a mount, tripod, and/or other accessory. When the hollow cavity of the lighting device is positioned over the portion of the mount, tripod, and/or other accessory such that the portion of the mount, tripod, and/or other accessory resides within the hollow cavity, a clamp may be utilized to secure the lighting device to the mount, tripod, and/or other accessory device. In certain embodiments, the clamp may be utilized to adjust the position of the lighting device with respect to the mount, tripod, and/or other accessory so that cameras, laser scanners, and/or other devices secure to the lighting device may generate content from various heights, angles, and/or perspectives.

Referring now to FIGS. 1, 2, 3, 4, 5, 6, 7, 8, 9, 10, 11, and 12, exemplary embodiments of lighting devices 100 are provided. In certain embodiments, the lighting device 100 may be configured to emit light in 360 degrees around the lighting device 100 and into an environment in which a user seeks to capture images, video, audio, and/or other content. In certain embodiments, an exemplary lighting device 100 may include a plurality of componentry. Such componentry may include, but are not limited to, a top housing 102, a bottom housing 110, a core body 120, a light emitting diode sheet 134, a diffuser casing 144, a power adapter assembly 170, a battery pack or supply 190, other componentry, or a combination thereof. In certain embodiments, the top housing 102 may include a cavity 101, which may be configured to extend within the top housing 102 for a portion of the height of the top housing 102 or all the way through the top housing 102. In certain embodiments, the top housing 102 may include a lip or groove 103 (or projection), which may be the means by which the top housing 102 is secured to the core body 120 of the lighting device 100. In certain embodiments, the lip or groove 103 may be made of aluminum, however, the lip or groove 103 may be made of any type of metal, plastic, and/or other material. In certain embodiments, the lip or groove 103 may be a male groove that may be configured to insert and lock into a corresponding female groove of the core body 120 (e.g., groove 122). In certain embodiments, the lip or groove 103 may have a cavity within the groove 103 that may be configured to receive a male groove of the core body 120 such that when the male groove of the core body is positioned within the cavity, the top housing 102 is secured to the core body 120. In certain embodiments, the lip or groove 103 may have threading that is configured to engage with threading of a groove 122 (and/or the core body 120) of the core body 120 such that when the lip or groove 103 is secured to the groove 122 and then the top housing 102 is rotated (e.g., such as in a clockwise direction), the top housing 102 may be locked into place with the core body 120. In certain embodiments, the lip or groove 103 may be cylindrical in shape (or other desired shape), may project downwards from the bottom portion of the top housing 102, and may reside generally in proximity to a perimeter of the top housing 102.

Figure 7:
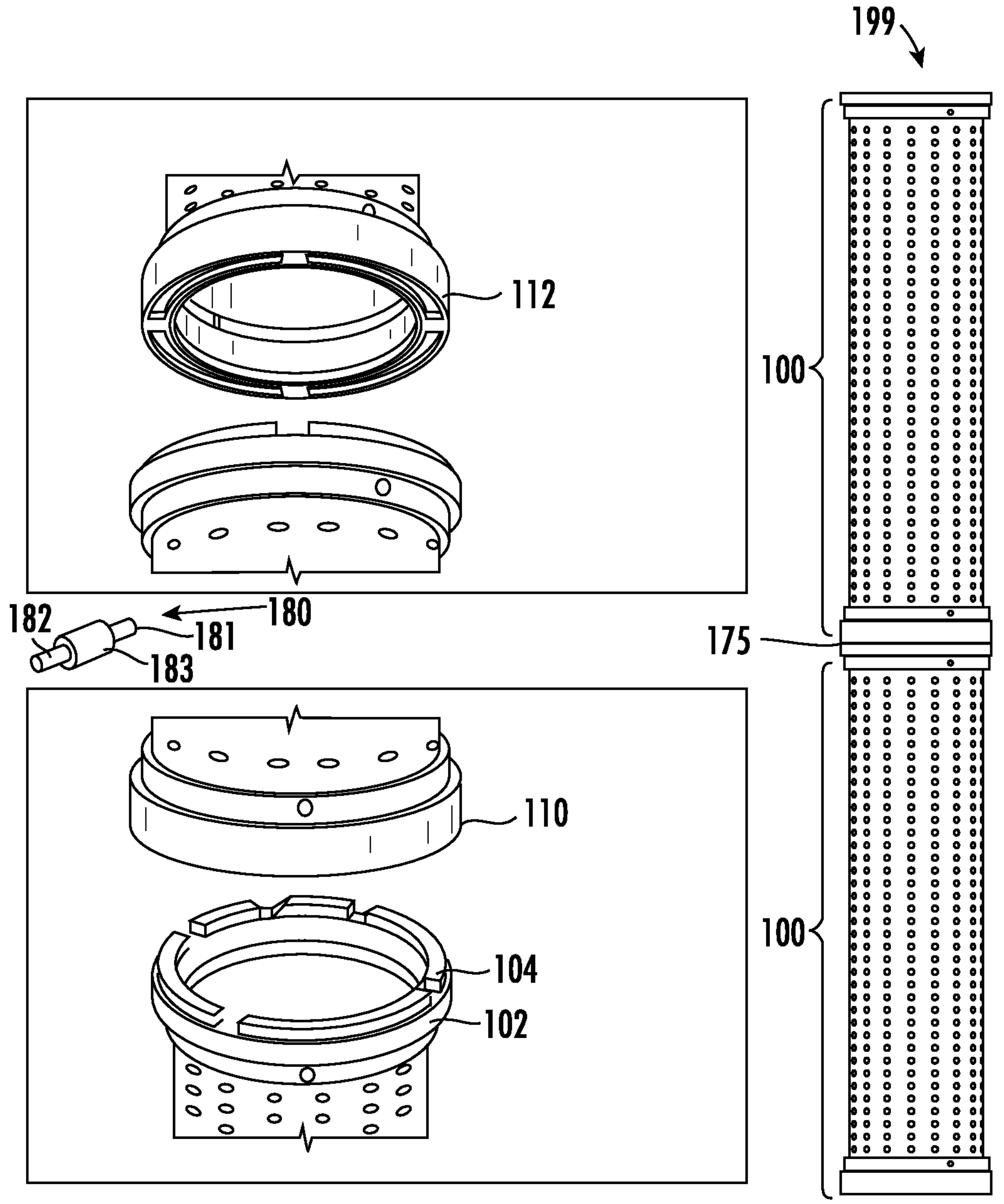
FIG. 7 illustrates various views of multiple lighting devices being secured together according to embodiments of the present disclosure.

In certain embodiments, the top housing 102 may include a groove 104 (e.g. male groove or projection) located on a top portion of the top housing 102. The groove 104 may be configured to engage with a female groove (e.g. female groove 112) of a separate lighting device 100 to form a combined lighting device 199, as shown in FIG. 7. In certain embodiments, the top housing 102 may include an opening 105, which may be configured to receive a fastening device 106 to secure the top housing 102 to the core body 120 further. In certain embodiments, the fastening device 106 may be a screw, a bolt, a tack, a piston, and/or any other fastening device 106 that may be sized and shaped to fit through the opening 105 and secure to the core body 120, such as via the core body opening 123 or to a surface of the core body 120. In certain embodiments, the top housing 102 may include a power adapter assembly 108, which may include a female receptacle configured to receive a male connector of a power supply that may be connected to a power source, such as a power socket connected to an electrical grid. In certain embodiments, the power adapter assembly 108 receptacle may be configured to receive a male connector of a connector device 180 that may be utilized to connect two lighting devices 100 together, as shown in FIG. 7. In certain embodiments, the top housing 102 may be configured to optionally include a processor 107, a memory 128, and a component 129. In certain embodiments, the processor 107 may be configured to be software, hardware, or a combination of hardware and software. In certain embodiments, for example, the processor 107 may be housed within the top housing 102, the bottom housing 110, and/or in the core body 120 of the lighting device 100. In certain embodiments, the memory 128 may be hardware, software, or a combination thereof, and may be configured to store data and also instructions, which the processor 107 may execute to perform various operations associated with the lighting device 100. In certain embodiments, the lighting device 100 may optionally include any number of components 129, which may be, but are not limited to, one or more communication modules, one or more sensors, one or more radio frequency devices (e.g., passive and/or active tags), one or more interfaces (e.g., display), one or more ports (e.g., USB, etc.), one or more power sources (e.g. battery packs, power supplies, etc.), any other componentry, or a combination thereof.

Figure 4:
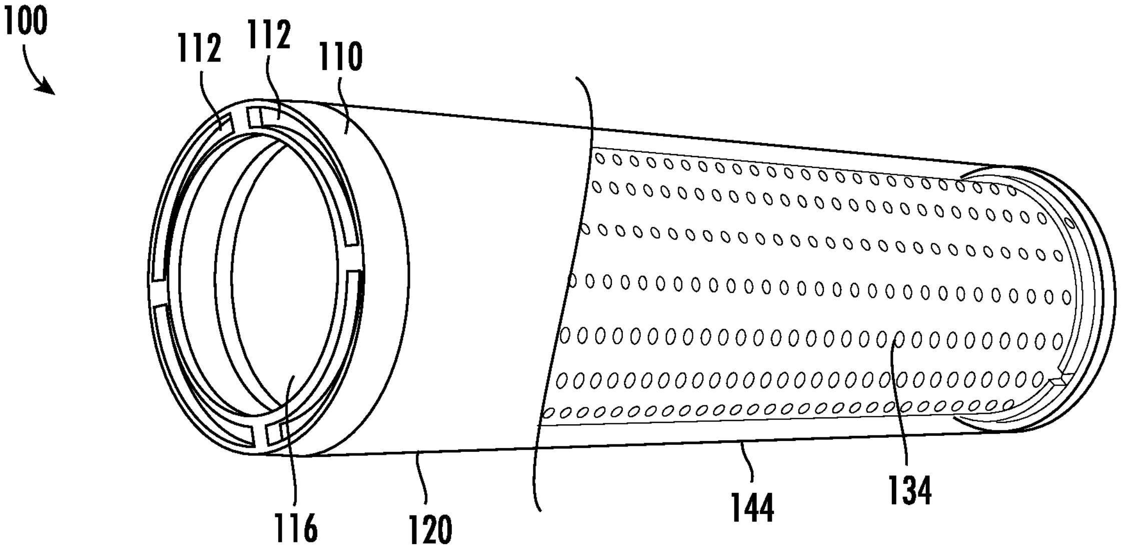
FIG. 4 illustrates an exemplary side view of a lighting device according to embodiments of the present disclosure.
Figure 5:
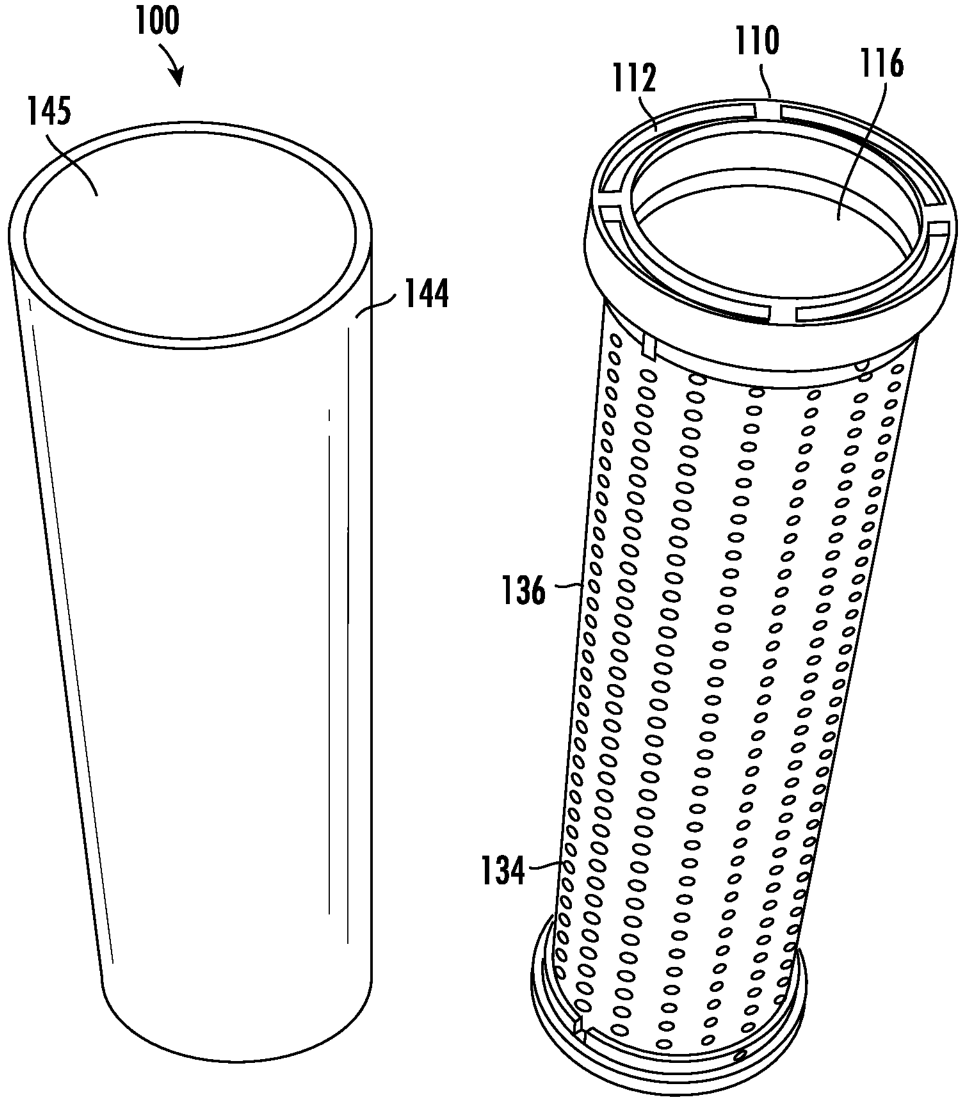
FIG. 5 illustrates an exemplary diffuser casing for use with a lighting device according to embodiments of the present disclosure.

In certain embodiments, the lighting device 100 may include a bottom housing 110. In certain embodiments, the bottom housing 110 may include a cavity 116, which may extend a portion of the height of the bottom housing 110 or the entire height of the bottom housing 110. In certain embodiments, the cavity 116 may have a similar or same shape to the cavity of the core body 120, the top housing 102, or a combination thereof. In certain embodiments, the bottom housing 110 may include a groove 112 located at the bottom of the bottom housing 110. In certain embodiments, the groove 112 may be a female groove, as shown in FIG. 4, however, in certain embodiments, the groove 112 may be a male groove. In certain embodiments, the groove 112 may be configured to engage and lock with a groove of a separate lighting device 100 to form a combined lighting device 199. In certain embodiments, the bottom housing 110 may include a lip or groove 117 (or projection), which may be the means by which the bottom housing 110 is secured to the core body 120 of the lighting device 100. In certain embodiments, the lip or groove 117 may be made of aluminum, however, the lip or groove 117 may be made of any type of metal, plastic, and/or other material. In certain embodiments, the lip or groove 117 may be a male groove that may be configured to insert and lock into a corresponding female groove of the core body 120 (e.g., a groove 124 depending on embodiment). In certain embodiments, the lip or groove 117 may have a cavity 113 within the groove 117 that may be configured to receive a male groove (e.g., groove 124 depending on embodiment) of the core body 120 such that when the male groove of the core body 120 is positioned within the cavity 113, the bottom housing 110 is secured to the core body 120. In certain embodiments, the lip or groove 117 may have threading that is configured to engage with threading of a groove 124 (and/or the core body 120) of the core body 120 such that when the lip or groove 117 is secured to the groove 124 and then the bottom housing 110 is rotated (e.g., such as in a clockwise direction), the bottom housing 110 may be locked into place with the core body 120. In certain embodiments, the lip or groove 117 may be cylindrical in shape (or other desired shape), may project upwards from the top portion of the bottom housing 110, and may reside generally in proximity to a perimeter of the bottom housing 110.

Figure 6:
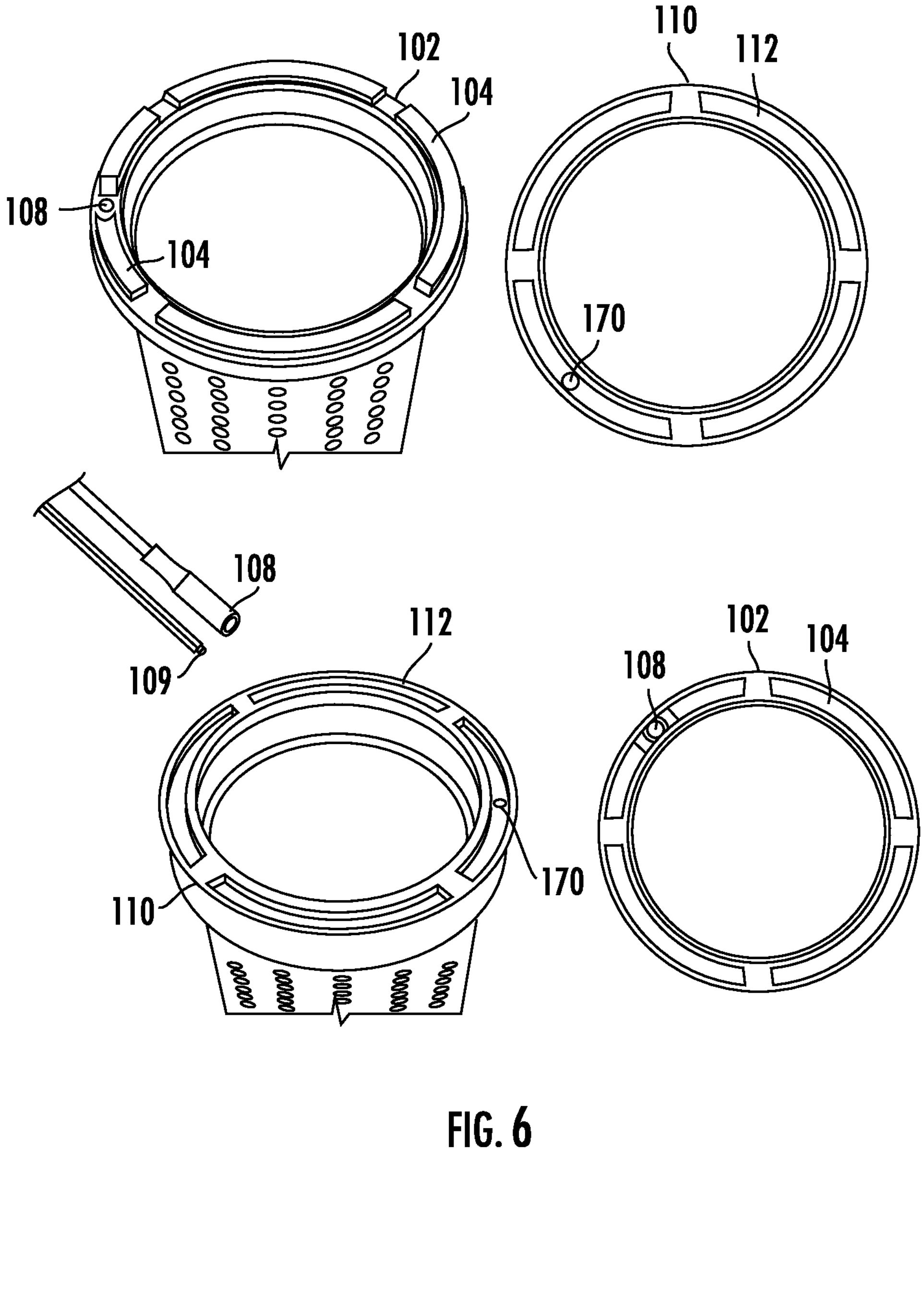
FIG. 6 illustrates various views of multiple lighting devices that may be secured together according to embodiments of the present disclosure.

In certain embodiments, the bottom housing 110 may include an opening 114, which may be configured to receive a fastening device 115 to secure the bottom housing 110 to the core body 120 further. In certain embodiments, the fastening device 115 may be a screw, a bolt, a tack, a piston, and/or any other fastening device 115 that may be sized and shaped to fit through the opening 114 and secure to the core body 120, such as via a core body opening (e.g., such as opening 123 that may be located on the groove 124 or to a surface of the core body 120. In certain embodiments, the bottom housing 110 may include a power adapter assembly 170, as shown in FIG. 6, which may include a female receptacle configured to receive a male connector of a power supply that may be connected to a power source, such as a power socket. In certain embodiments, the power adapter assembly 170 receptacle may be configured to receive a male connector of a connector device 180 that may be utilized to connect two lighting devices 100 together, as shown in FIG. 7.

In certain embodiments, the lighting device 100 may include a core body 120. In certain embodiments, the core body 120 may include a cavity 118, a lip or groove 122 (or projection), an optional opening 123, a lip or groove 124 (or projection), any other componentry, or a combination thereof. In certain embodiments, the cavity 118 may be configured to extend an entire height of the core body 120, however, in certain embodiments, the cavity 118 may extend for less than the entire height of the core body 120. In certain embodiments, the lip or groove 122 may have threading such that when the lip or groove 103 is engaged with the lip or groove 122, the top housing 102 or core body 120 may be rotated (e.g., in a clockwise fashion) to lock the top housing 102 to the core body 120. In certain embodiments, the lip or groove 122 may be configured to snap together with the lip or groove 103 of the top housing 102 and may maintain the connection with the top housing 102 via an interference fit.

In certain embodiments, the lip or groove 122 may have a cylindrical shape (or any other desired shape) and may be located on a top portion of the core body 120. In certain embodiments, the core body 120 may be made of aluminum, any type of metal, any type of plastic, any type of material, or a combination thereof. In certain embodiments, the core body 120 may be configured to house wiring for power adapter assembly 108, wiring for a battery pack (e.g., battery pack 190), any other wiring of the lighting device 100, or a combination thereof.

In certain embodiments, the lighting device 100 may include a light emitting diode sheet 134 including any number of light emitting diodes 136 configured to emit light. In certain embodiments, the light emitting diodes may be on one side of the light emitting diode sheet 135 and may be configured to be equidistant from each other, at random locations on the light emitting diode sheet 134, in various patterns, or a combination thereof. In certain embodiments, the light emitting diode sheet 134 may include a flexible printed circuit board that may be bendable in a variety of directions, angles, and/or manners. In certain embodiments, the light emitting diode sheet 134 may include any number of terminals, which may be configured to connect with an end 109 of a power adapter assembly 108 so that power may be delivered to the light emitting diode sheet 134 to activate the light emitting diodes 136 of the light emitting diode sheet 134. In certain embodiments, the light emitting diode sheet 134 may be configured to have adhesive on an underside of the light emitting diode sheet 134, which may be utilized to affix or secure the light emitting diode sheet 134 to the surface of the core body 120 of the lighting device 100 when the light emitting diode sheet 134 is wrapped around the exterior surface of the core body 120. In certain embodiments, the light emitting diode sheet 134 may be a 12 volt sheet (e.g., operating voltage), however, in other embodiments, other voltages may be utilized. In certain embodiments, the side of the light emitting diode sheet 134 with the light emitting diodes 136 may include a translucent film to protect the light emitting diodes 136 and/or the light emitting diode sheet 134. In certain embodiments, the size of the light emitting diodes 136, the color output, and the intensity of the emitted light may be adjustable, such as by utilizing a controller of the light emitting diode sheet 134 (e.g., first user device 1302, remote controller, and/or switch or input device of the light emitting diode sheet 134 itself). In certain embodiments, the light emitting diodes 136 may be configured to pulse at a certain rate, which may be set by the user. In certain embodiments, the light emitting diode sheet 134 may incorporate a battery pack to provide power to the light emitting diodes 136.

In certain embodiments, the lighting device 100 may include a diffuser casing 144, which may be configured to protect the plurality of light emitting diodes 136 of the light emitting diode sheet 134 and diffuse light emitted from the light emitting diodes 136 into an environment and/or in an even manner. In certain embodiments, the diffuser casing 144 may have a hollow cavity 145 that is sized and shaped to be positioned (e.g. slipped over) over the top portion of the core body 120. In certain embodiments, the diffuser casing 144 may be positioned over a bottom portion of the core body 120 and moved upwards until the diffuser casing contacts the top housing 102 of the lighting device. In certain embodiments, the diffuser casing 144 may be configured to reside between the top housing 102 and the bottom housing 110 of the lighting device 100 and may be positioned onto the lighting device 100 after the light emitting diode sheet 134 is secured to the core body 120. In certain embodiments, the diffuser casing 144 may be transparent, partially transparent, partially opaque, or a combination thereof. In certain embodiments, parts of the diffuser casing 144 may be transparent while other parts may be partially transparent, partially opaque, or a combination thereof. In certain embodiments, the diffuser casing 144 may enable diffusion of light emitted by the light emitting diodes 136 of the light emitting diode sheet 134 to facilitate the diffusion of light into an environment in 360 degrees. In certain embodiments, the diffuser casing 144 may include patterns etched into the casing to adjust the manner in which light is diffused into the environment from the lighting device 100. In certain embodiments, the diffuser casing 144 may be cylindrical or any other desired shape and may be made of plastic, glass, Teflon, and/or any other material. In certain embodiments, the cavity 145 of the diffuser casing 144 may be configured to align with the top housing 102 cavity, the bottom housing cavity, the core body cavity, or a combination thereof.

In certain embodiments, the lighting device 100 may incorporate the use of a connector 180, which may include two male connectors 181 and 182 extending from a connector body 183 of the connector 180. In certain embodiments, the connector 180 may be configured to be a 5.5 mm×2.1 DC connector, however, any other specifications may be utilized. In certain embodiments, the connector 180 may be utilized to connect two or any number of lighting devices 100 together. For example, as shown in FIGS. 6 and 7, one of the male connectors 181 may be inserted into the power adapter assembly 170 socket and the other male connector 182 may be inserted into the power supply 108 socket to connect the two lighting devices 100 together. Once the connector 180 is connected to both lighting devices, as shown in FIG. 7, power may be delivered to both lighting devices 100 simultaneously. In certain embodiments, any number of lighting devices 100 may be secured together such as by utilizing any number of connectors 180.

Figure 8:
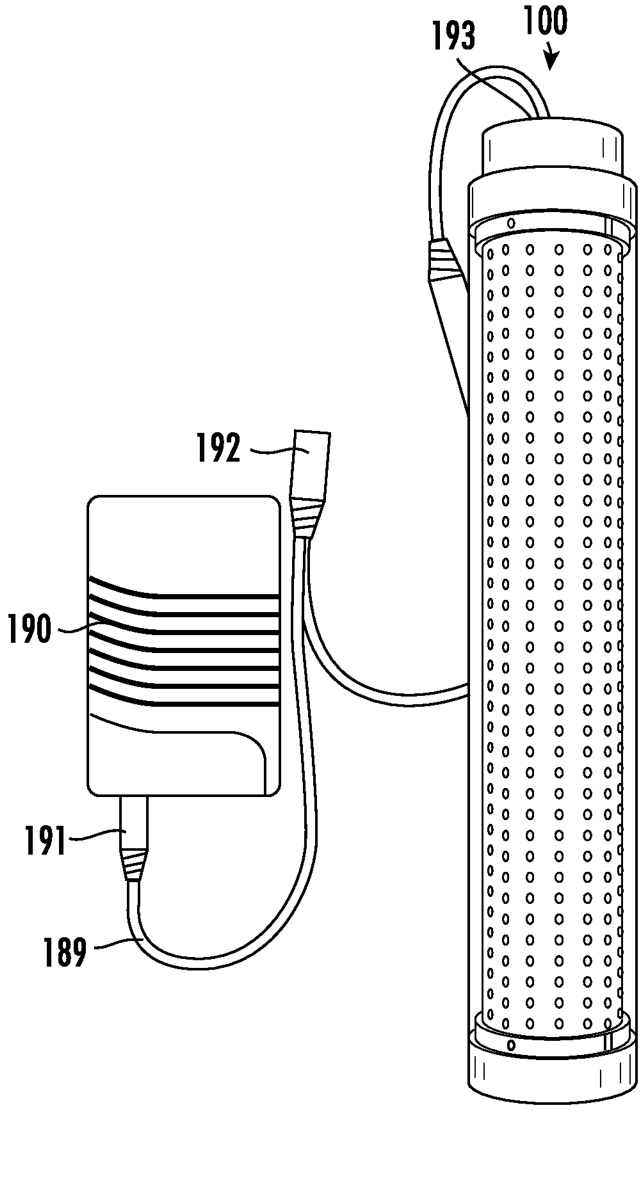
FIG. 8 illustrates an exemplary lighting device in an inactivated state with an accompanying battery pack according to embodiments of the present disclosure.
Figure 9:
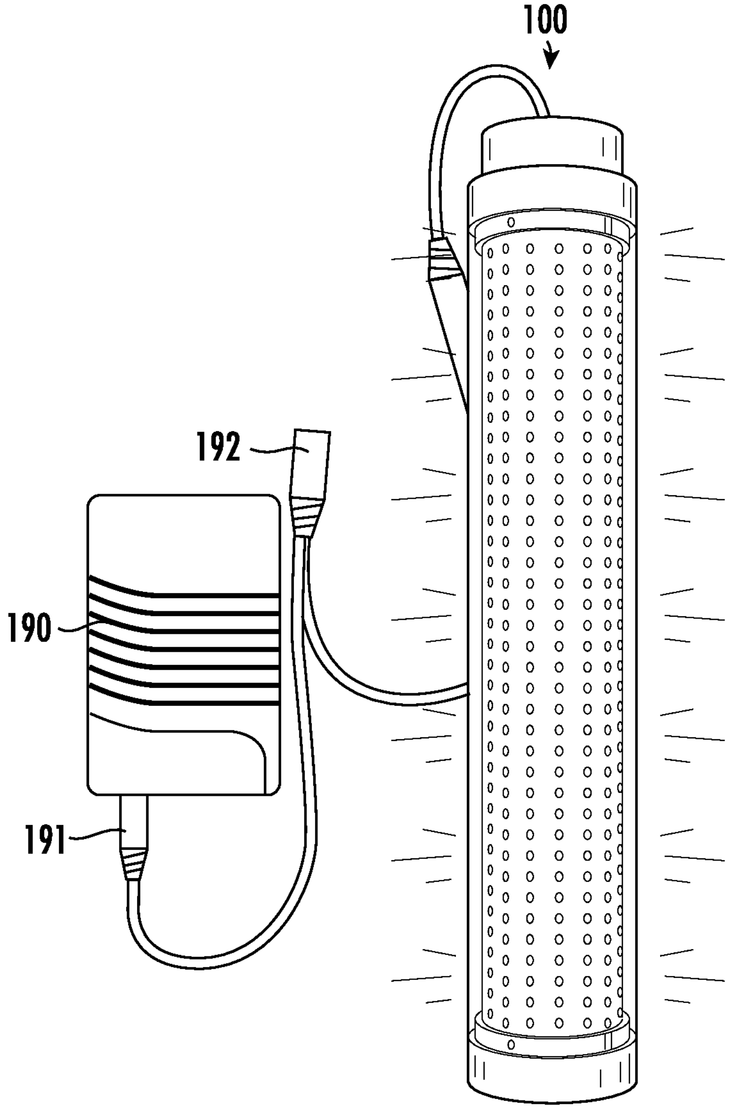
FIG. 9 illustrates an exemplary lighting device in an activated state with an accompanying battery pack according to embodiments of the present disclosure.
Figure 10:
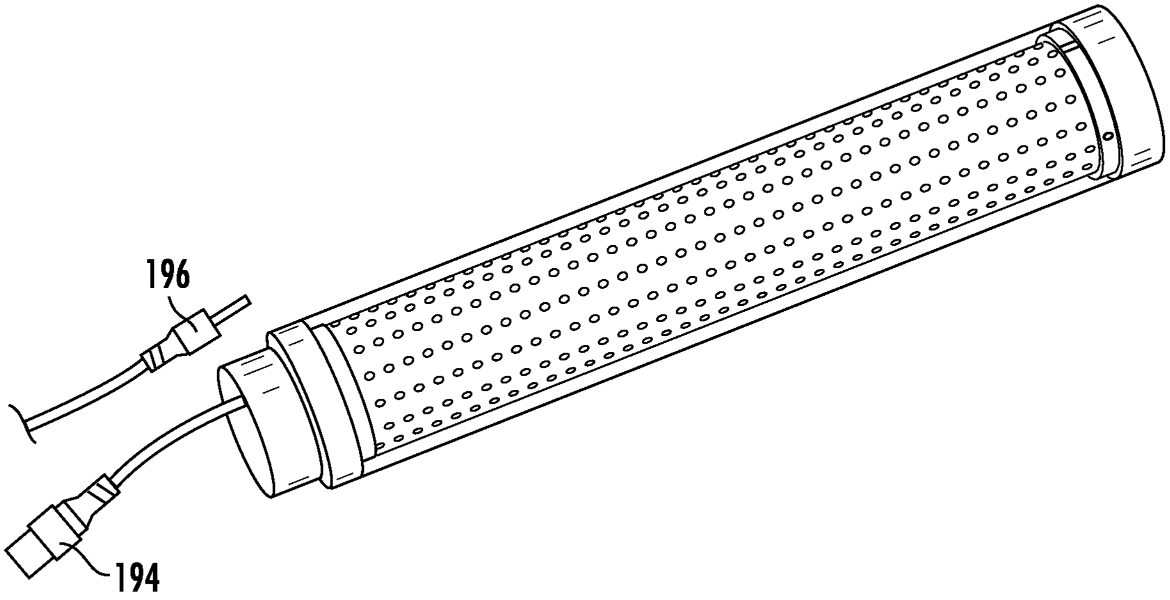
FIG. 10 illustrates an exemplary lighting device featuring an exemplary power adapter assembly according to embodiments of the present disclosure.

In certain embodiments, the lighting device 100 may be powered by a battery pack or supply 190, as shown in FIG. 9. In certain embodiments, the battery pack 190 may include a switch to turn on or off power to the lighting device 100 and may include any type of battery, such as, but not limited to a DC 12V rechargeable lithium ion battery. In certain embodiments, the battery pack or supply 190 may include indicator lights that may indicate how much battery power is left in the battery pack 190. In certain embodiments, the battery pack 190 may be recharged using a power cable connected to the battery pack 190 and to an electrical socket or other power source. In certain embodiments, the battery pack 190 may include a DC 1 female to 2 male power splitter cable 189. For example, the splitter cable 189 may have a male connector 191, a male connector 193, and a female connector 192, which may be connected to the lighting device 100, battery pack 190, and/or to other devices. As shown in FIG. 8, the male connector 191 may be connected to a power port of the battery pack 190 and the male connector 193 may be connected to the port of the power adapter assembly 108. In certain embodiments, the lighting device 100 may be powered with a power supply including a power cable and connector 196, which may be connected to a power cable 194 to deliver power directly from an electrical socket or other power source. In certain embodiments, the power supply may include a switch for turning off or on power to the lighting device 100. In certain embodiments, the power supply may be a 12V power supply, however, other voltages may also be utilized as well.

Figure 11:
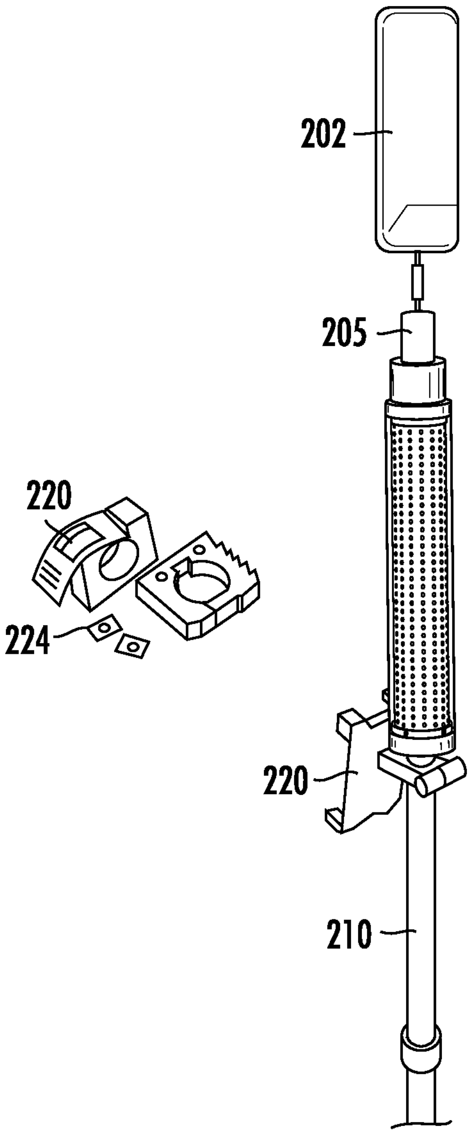
FIG. 11 illustrates and exemplary lighting device in an inactivated state that is secured to a tripod and camera device according to embodiments of the present disclosure.
Figure 12:
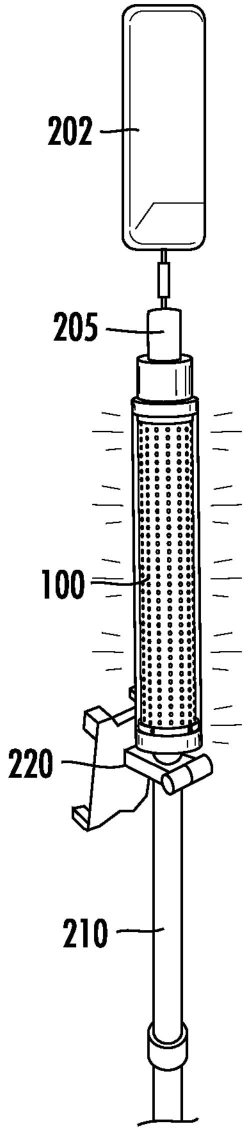
FIG. 12 illustrates and exemplary lighting device in an activated state that is secured to a tripod and camera device according to embodiments of the present disclosure.

In certain embodiments, the lighting device 100 may be secured to a stand or mount 210, as shown in FIG. 11. The lighting device 100 may be secured to the stand or mount via a clamp 220, which may have washers 224 which may be utilized to secure the clamp to a plate or a wall, such as via screws or other fastening devices. In certain embodiments, the clamp 220 may be configured to hold the lighting device 100 at a specific height on the stand or mount 210 and the claim 220 may be utilized to adjust the height of the lighting device 100 with respect to the stand or mount 210, such as after the portion of the stand or mount 210 is inserted into the cavity 118 of the core body 120 of the lighting device 100. In certain embodiments, the lighting device 100 may include an attachment 205 that may be secured to the top housing 102, which may be utilized to connect with a camera 202, laser scanner, and/or other device. Once the camera 202, laser scanner, and/or other device is secured to the attachment and the lighting device 100 is activated, the user (e.g. first user 1301) of the lighting device 100 may capture video content, audio content, augmented reality content, virtual reality content, and/or generate representations of an environment and/or objects contained therein. The quality of such content and representations is enhanced based on the 360 degree lighting capability provided by the lighting device 100.

Figure 13:
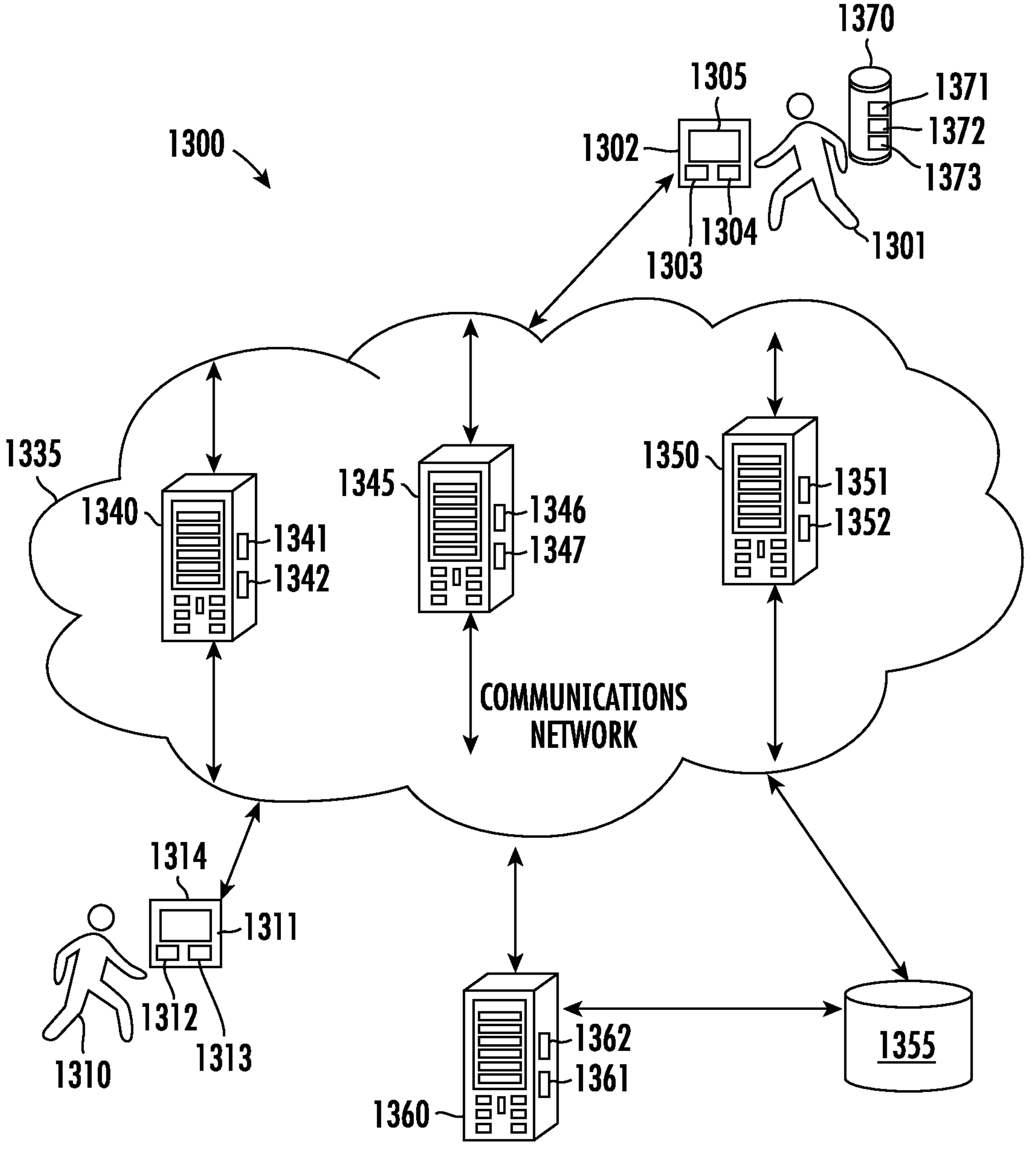
FIG. 13 illustrates an exemplary system that may interact with a lighting device according to embodiments of the present disclosure.
Figure 14:
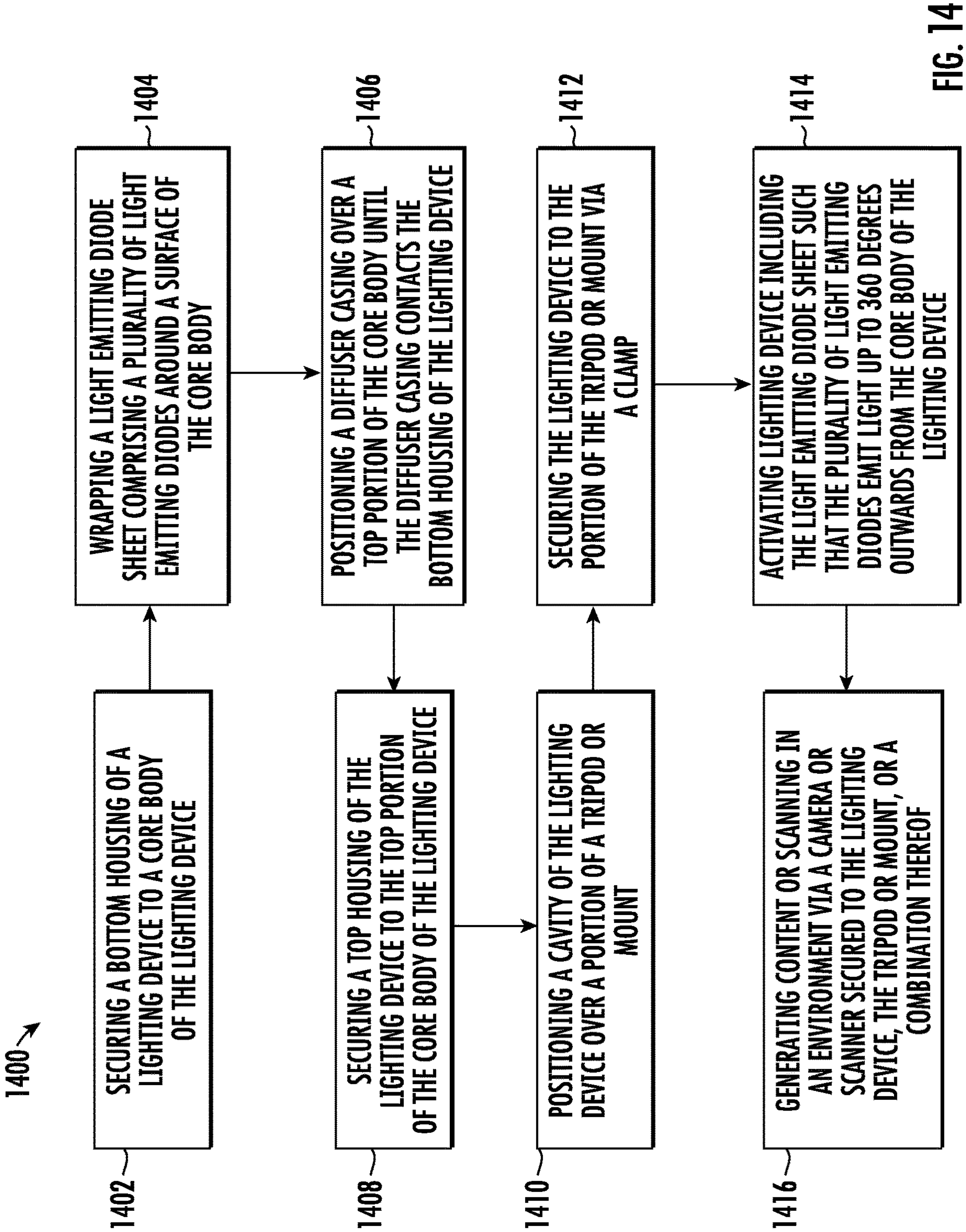
FIG. 14 is a flow diagram illustrating a sample method for utilizing an exemplary lighting device according to embodiments of the present disclosure.
Figure 15:
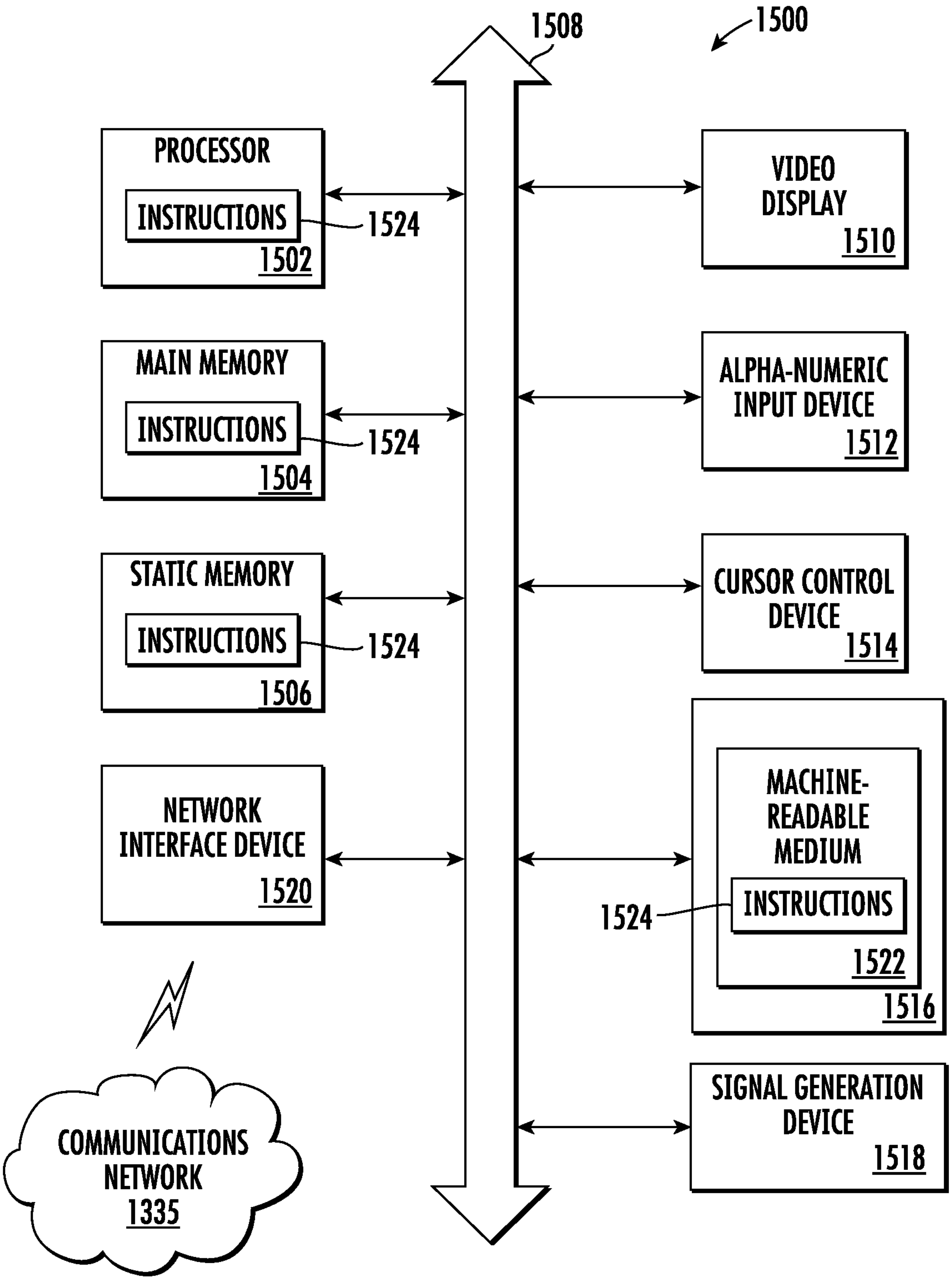
FIG. 15 is a schematic diagram of a machine in the form of a computer system within which a set of instructions, when executed, may cause the machine to interact with and/or utilize a lighting device according to embodiments of the present disclosure.

As shown in FIG. 1-12 and referring also more specifically to FIGS. 13-15, a system 1300 including a lighting device and accompanying methods (e.g., method 1400) for assembling and utilizing a lighting device are disclosed. Notably, the system 100 may be configured to support, but is not limited to supporting, lighting systems and devices, camera systems and devices, LiDAR systems and devices, content-generating systems and devices, laser scanning systems and devices, sensor devices and systems, data analytics systems and services, artificial intelligence services and systems, machine learning services and systems, security systems and services, content delivery services, cloud computing services, satellite services, telephone services, voice-over-internet protocol services (VoIP), software as a service (SaaS) applications, platform as a service (PaaS) applications, mobile applications and services, and/or any other computing applications and services. Notably, the system 1300 may include a first user 1301, who may utilize a first user device 1302 to access data, content, and services, or to perform a variety of other tasks and functions. As an example, the first user 1301 may utilize first user device 1302 to transmit signals to access various online services and content, such as those available on an internet, on mobile devices, on other devices, and/or on various computing systems. As another example, the first user device 1302 may be utilized to access an application, devices, and/or components of the system 1300 that provide any or all of the operative functions of the system 1300. In certain embodiments, the first user 1301 may be any type of person, a robot, a humanoid, a program, a computer, any type of user, or a combination thereof. In certain embodiments, the first user 1301 may be a person that may want to capture image content, video content, and/or any type of content associated with objects, an environment, or a combination thereof. In certain embodiments, the first user 1301 may be a person that may want to utilize a laser scanner (e.g., LiDAR) to scan an environment generate a digital representation of the environment and/or objects contained therein.

The first user device 1302 may include a memory 1303 that includes instructions, and a processor 1304 that executes the instructions from the memory 1303 to perform the various operations that are performed by the first user device 1302. In certain embodiments, the processor 1304 may be hardware, software, or a combination thereof. The first user device 1302 may also include an interface 1305 (e.g. screen, monitor, graphical user interface, etc.) that may enable the first user 1301 to interact with various applications executing on the first user device 1302 and to interact with the system 1300. In certain embodiments, the first user device 1302 may be and/or may include a computer, a camera, a laser scanner, any type of sensor, a laptop, a set-top-box, a tablet device, a phablet, a server, a mobile device, a smartphone, a smart watch, and/or any other type of computing device. Illustratively, the first user device 1302 is shown as a smartphone device in FIG. 13. In certain embodiments, the first user device 1302 may be utilized by the first user 1301 to control and/or provide some or all of the operative functionality of the system 1300.

In addition to using first user device 1302, the first user 1301 may also utilize and/or have access to additional user devices. As with first user device 1302, the first user 1301 may utilize the additional user devices to transmit signals to access various online services and content. The additional user devices may include memories that include instructions, and processors that executes the instructions from the memories to perform the various operations that are performed by the additional user devices. In certain embodiments, the processors of the additional user devices may be hardware, software, or a combination thereof. The additional user devices may also include interfaces that may enable the first user 1301 to interact with various applications executing on the additional user devices and to interact with the system 1300. In certain embodiments, the first user device 1302 and/or the additional user devices may be and/or may include a computer, a camera, a laser scanner, any type of sensor, a laptop, a set-top-box, a tablet device, a phablet, a server, a mobile device, a smartphone, a smart watch, and/or any other type of computing device, and/or any combination thereof. Sensors may include, but are not limited to, cameras, wearable devices (e.g., wearable devices, digital wristbands, etc.), motion sensors, acoustic and audio sensors, pressure sensors, temperature sensors, light sensors, any type of sensors, or a combination thereof.

The first user device 1302 and/or additional user devices may belong to and/or form a communications network. In certain embodiments, the communications network may be a local, mesh, or other network that enables and/or facilitates various aspects of the functionality of the system 1300. In certain embodiments, the communications network may be formed between the first user device 1302 and additional user devices through the use of any type of wireless or other protocol and/or technology. For example, user devices may communicate with one another in the communications network by utilizing any protocol and/or wireless technology, satellite, fiber, or any combination thereof. Notably, the communications network may be configured to communicatively link with and/or communicate with any other network of the system 1300 and/or outside the system 1300.

In certain embodiments, the first user device 1302 and additional user devices belonging to the communications network may share and exchange data with each other via the communications network. For example, the devices of the system 1300 may share information relating to the various components of the user devices, information associated with images and/or content generated by the devices of the system 1300, information identifying the locations of the user devices and/or lighting device, information indicating the types of sensors that are contained in and/or on the devices of the system 1300, information identifying the applications being utilized on the devices of the system 1300, information identifying how the devices of the system 1300 are being utilized by a user, information identifying user profiles for users of the user devices, information identifying device profiles for the devices of the system 100, information identifying the number of devices in the communications network, information identifying devices being added to or removed from the communications network, any other information, or any combination thereof. In certain embodiments, the devices of the system 1300 may share content obtained via sensors of the devices, such as, but not limited to, video content, audio content, haptic content, vibration content, augmented reality content, virtual reality content, sensor data (e.g., light sensor data, motion data (e.g., motion of objects in an environment), any other data, or a combination thereof.

In addition to the first user 1301, the system 1300 may also include a second user 1310. In certain embodiments, for example, the second user 1310 may be another person that may seek to obtain image content, video content, audio content, and/or any other content, such as by utilizing the second user device 1311 and/or the lighting device 1370. In certain embodiments, the second user device 1311 may be utilized by the second user 1310 to transmit signals to request various types of content, services, and data provided by and/or accessible by communications network 1335 or any other network in the system 1300. In further embodiments, the second user 1310 may be a robot, a computer, a vehicle, a humanoid, an animal, any type of user, or any combination thereof. The second user device 1311 may include a memory 1312 that includes instructions, and a processor 1313 that executes the instructions from the memory 1312 to perform the various operations that are performed by the second user device 1311. In certain embodiments, the processor 1313 may be hardware, software, or a combination thereof. The second user device 1311 may also include an interface 1314 (e.g. screen, monitor, graphical user interface, etc.) that may enable the first user 1301 to interact with various applications executing on the second user device 1311 and, in certain embodiments, to interact with the system 1300. In certain embodiments, the second user device 1311 may be a computer, a camera, a laser scanner, a laptop, a set-top-box, a tablet device, a phablet, a server, a mobile device, a smartphone, a smart watch, and/or any other type of computing device. Illustratively, the second user device 1311 is shown as a mobile device in FIG. 13. In certain embodiments, the second user device 1311 may also include sensors, such as, but are not limited to, cameras, audio sensors, motion sensors, temperature sensors, light sensors, any type of sensors, or a combination thereof.

In certain embodiments, the first user device 1302, the additional user devices, and/or the second user device 1311 may have any number of software applications and/or application services stored and/or accessible thereon. For example, the first user device 1302, the additional user devices, and/or the second user device 1311 may include applications for controlling and/or accessing the operative features and functionality of the system 1300, applications for controlling and/or accessing any device of the system 100, cloud-based applications, phone-based applications, e-commerce applications, media streaming applications, content-based applications, media-editing applications, database applications, internet-based applications, browser applications, mobile applications, service-based applications, productivity applications, video applications, audio applications, social media applications, any other type of applications, any types of application services, or a combination thereof. In certain embodiments, the software applications may support the functionality provided by the system 1300 and methods described in the present disclosure. In certain embodiments, the software applications and services may include one or more graphical user interfaces so as to enable the first and/or potentially second users 1301, 1310 to readily interact with the software applications. The software applications and services may also be utilized by the first and/or potentially second users 1301, 1310 to interact with any device in the system 100, any network in the system 100, or any combination thereof. In certain embodiments, the first user device 1302, the additional user devices, and/or potentially the second user device 1311 may include associated telephone numbers, device identities, or any other identifiers to uniquely identify the first user device 1302, the additional user devices, and/or the second user device 1311.

The system 1300 may also include a communications network 1335. The communications network 1335 may be under the users of the system 1300 and/or under control of a service provider, any other designated user, a computer, another network, or a combination thereof. The communications network 1335 of the system 1300 may be configured to link each of the devices in the system 1300 to one another. For example, the communications network 1335 may be utilized by the first user device 1302 to connect with other devices within or outside communications network 1335. Additionally, the communications network 1335 may be configured to transmit, generate, and receive any information and data traversing the system 1300. In certain embodiments, the communications network 1335 may include any number of servers, databases, or other componentry. The communications network 1335 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 1340, 1345, and 1350 are shown as being included within communications network 1335. In certain embodiments, the communications network 1335 may be part of a single autonomous system that is located in a particular geographic region or be part of multiple autonomous systems that span several geographic regions.

Notably, the functionality of the system 1300 may be supported and executed by using any combination of the servers 1340, 1345, 1350, and 1360. The servers 1340, 1345, and 1350 may reside in communications network 1335, however, in certain embodiments, the servers 1340, 1345, 1350 may reside outside communications network 1335. The servers 1340, 1345, and 1350 may provide and serve as a server service that performs the various operations and functions provided by the system 1300. In certain embodiments, the server 1340 may include a memory 1341 that includes instructions, and a processor 1342 that executes the instructions from the memory 1341 to perform various operations that are performed by the server 1340. The processor 1342 may be hardware, software, or a combination thereof. Similarly, the server 1345 may include a memory 1346 that includes instructions, and a processor 1347 that executes the instructions from the memory 1346 to perform the various operations that are performed by the server 1345. Furthermore, the server 1350 may include a memory 1351 that includes instructions, and a processor 152 that executes the instructions from the memory 1351 to perform the various operations that are performed by the server 1350. In certain embodiments, the servers 1340, 1345, 1350, and 1360 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 1340, 1345, 1350 may be communicatively linked to the communications network 1335, any network, any device in the system 1300, or any combination thereof.

The database 1355 of the system 1300 may be utilized to store and relay information that traverses the system 100, cache content that traverses the system 100 (e.g., content captured by a camera of the system and/or laser scanner), store data about each of the devices in the system 1300 and perform any other typical functions of a database. In certain embodiments, the database 1355 may be connected to or reside within the communications network 1335, any other network, or a combination thereof. In certain embodiments, the database 1355 may serve as a central repository for any information associated with any of the devices and information associated with the system 100. Furthermore, the database 1355 may include a processor and memory or may be connected to a processor and memory to perform the various operation associated with the database 1355. In certain embodiments, the database 1355 may be connected to the servers 1340, 1345, 1350, 1360, the first user device 1302, the second user device 1311, the lighting device 1370, the additional user devices, any devices in the system 1300, any process of the system 1300, any program of the system 1300, any other device, any network, or any combination thereof.

The database 1355 may also store information and metadata obtained from the system 1300, store metadata and other information associated with the first and second users 1301, 1310, storing information associated with the lighting device 1370 (and/or lighting device 100) (e.g., types of light emitting diodes, whether the lighting device 1370 is activated or deactivated, how much power is left for a battery pack of the lighting device 1370, etc.), store content generated by devices of the system 1300 (e.g., first and/or second user devices 1302, 1311, and/or cameras), store representations generated by a laser scanner and/or other device of the system 1300, store sensor data and/or content obtained from an environment associated with the first and/or second users 1301, 1310, store user profiles associated with the first and second users 1301, 1310, store device profiles associated with any device in the system 1300, store communications traversing the system 1300, store user preferences, store information associated with any device or signal in the system 1300, store information relating to patterns of usage relating to the user devices 1302, 1311, store any information obtained from any of the networks in the system 100, store historical data associated with the first and second users 1301, 1310, store device characteristics, store information relating to any devices associated with the first and second users 1301, 1310, store information associated with the communications network 1335, store any information generated and/or processed by the system 100, store any of the information disclosed for any of the operations and functions disclosed for the system 1300 herewith, store any information traversing the system 1300, or any combination thereof. Furthermore, the database 1355 may be configured to process queries sent to it by any device in the system 100.

The system 1300 may also include a lighting device 1370. In certain embodiments, the lighting device 1370 may include some or all of the components of lighting device 100. In certain embodiments, for example, the lighting device 1370 may include a core body, a top housing configured to couple to the core body, a bottom housing configured to couple to the core body, a diffuser casing, a light emitting diode sheet including any number of light emitting diodes, a clamp to secure the lighting device 1370 to a mount, tripod, and/or other accessory (e.g., tripod or mount 210), any other componentry, or a combination thereof. In certain embodiments, the lighting device 100 may include a processor 1371, a memory 1372, and a component 1373. In certain embodiments, the processor 1371 may be configured to be software, hardware, or a combination of hardware and software. In certain embodiments, for example, the processor 1371 may be housed within the top housing, the bottom housing, and/or even in the core body of the lighting device 1370. In certain embodiments, the memory 1372 may be hardware, software, or a combination thereof, and may be configured to store data and also instructions, which the processor 1371 may execute to perform various operations associated with the lighting device 1370.

In certain embodiments, the lighting device 1370 may include any number of component 1373, which may be, but are not limited to, one or more communication modules, one or more sensors, one or more radio frequency devices (e.g., passive and/or active tags), one or more cameras, one or more laser scanners, one or more interfaces (e.g., display), one or more ports (e.g., USB, etc.), one or more power sources (e.g. battery packs, power supplies, etc.), any other componentry, or a combination thereof. In certain embodiments, the component 1373 may communicatively link the lighting device 1370 to any of the devices in the system 1300, such as by using any of the foregoing componentry and technologies. In certain embodiments, for example, the first and/or second user devices 1302, 1311 may be configured to control the operative functionality of the lighting device 1370. For example, the first user device 1302, such as via an application of the first user device 1302, may provide a user interface for the first user 1301 to interact with to control the lighting device 1370. In certain embodiments, for example, the application may enable the first user device 1302 to activate the lighting device 1370, deactivate the lighting device 1370, cause the light emitting diodes of the light emitting diode sheet to pulse at a certain rate and/or pattern, adjust an intensity of the light emitted by the light emitting diodes, adjust a color of the light emitted by the light emitting diodes, adjust an amount of power delivered to the lighting device 1370, cause some of the light emitting diodes to turn off while other light emitting diodes are turned on, cause the lighting device 1370 to enter into a sleep mode (e.g., to conserve power if using a battery pack or power supply), cause the lighting device 1370 to enter into an awake mode (e.g. to receive instructions from the first user device 1302), or a combination thereof.

Notably, as shown in FIG. 1, the system 1300 may perform any of the operative functions disclosed herein by utilizing the processing capabilities of server 1360, the storage capacity of the database 1355, or any other component of the system 1300 to perform the operative functions disclosed herein. The server 1360 may include one or more processors 1362 that may be configured to process any of the various functions of the system 1300. The processors 1362 may be software, hardware, or a combination of hardware and software. Additionally, the server 1360 may also include a memory 1361, which stores instructions that the processors 1362 may execute to perform various operations of the system 1300. For example, the server 1360 may assist in processing loads handled by the various devices in the system 1300, such as, but not limited to, receiving content generated by cameras and/or laser scanners; facilitating generation of content generated by cameras and/or laser scanners; activating and/or deactivating a camera and/or laser scanners; activating and/or deactivating the lighting devices 1370 (and/or 100); and performing any other operations conducted in the system 100 or otherwise. In one embodiment, multiple servers 1360 may be utilized to process the functions of the system 100. The server 1360 and other devices in the system 1300, may utilize the database 1355 for storing data about the devices in the system 1300 or any other information that is associated with the system 1300. In one embodiment, multiple databases 1355 may be utilized to store data in the system 1300.

Although FIGS. 1-15 illustrates specific example configurations of the various components of the lighting device 100, lighting device 1370, system 1300, the system 1300 may include any configuration of the components, which may include using a greater or lesser number of the components. For example, the system 1300 is illustratively shown as including a first user device 1302, a second user device 1311, a communications network 1335, a server 1340, a server 1345, a server 1350, a server 1360, a database 1355, and a lighting device 1370. However, the system 1300 may include multiple first user devices 1302, multiple second user devices 1311, multiple communications networks 1335, multiple servers 1340, multiple servers 1345, multiple servers 1350, multiple servers 1360, multiple databases 1355, multiple lighting devices 1370, or any number of any of the other components inside or outside the system 1300. Furthermore, in certain embodiments, substantial portions of the functionality and operations of the system 1300 may be performed by other networks and systems that may be connected to system 1300.

As shown in FIG. 14, an exemplary method 1400 for assembling and utilizing a lighting device (e.g., lighting device 100 or other lighting device described herein) is schematically illustrated. The method 1400 and/or functionality and features supporting the method 1400 may be conducted by a user (e.g., first user 1301 and/or second user 1310), may be conducted via an application of the system 1300, devices of the system 1300, processes of the system 1300, any component of the system 1300, or a combination thereof. The method 1400 may include steps for assembling componentry of an exemplary lighting device and utilizing the lighting device to facilitate the capture of content by a device, such as a camera, laser scanning of an environment, or a combination thereof. In certain embodiments, the method 1400 may include some of the steps shown in FIG. 14 or all of the steps in FIG. 14. In certain embodiments, method 1400 may be supplemented with any of the functionality described in the present disclosure. At step 1402, the method 1400 may include securing a bottom housing of a lighting device (e.g., lighting device 100) to a core body of the lighting device. For example, in certain embodiments, the bottom housing may have a locking groove configured to connect with a bottom groove or thread portion located at the bottom of the core body. In certain embodiments, if the core body has a thread portion (in certain embodiments may be a form of groove), the locking groove of the bottom housing may be positioned onto the thread portion and the bottom housing may be rotated until the bottom housing locks into place onto the bottom of the lighting device. In certain embodiments, if the core body has a groove (e.g., male groove or female groove), the bottom housing may have a complementary groove (e.g., if core body has a male groove the bottom housing may have a female groove and vice versa). In certain embodiments the groove of the core body may be secured to the groove of the bottom housing, such as via an interference fit. In certain embodiments, the bottom housing may be cylindrical or any other desired shape and may correspond with the shape of the core body to which it is being attached.

In certain embodiments, at step 1404, the method 1400 may include wrapping a light emitting diode sheet comprising a plurality of light emitting diodes around a surface of the core body of the lighting device. For example, if the core body has a cylindrical shape, the light emitting diode sheet may be configured to wrap around the cylindrical core body such that the light emitting diode sheet takes the cylindrical form of the core body of the lighting device. In certain embodiments, other shapes of the core body may also be utilized as well, such as, but not limited to, square, rectangular, pyramidal, conical, and/or other shapes. In certain embodiments, the plurality of light emitting diodes may be positioned equidistant from each other on the light emitting diode, however, in certain embodiments, the light emitting diodes may be positioned in random locations, in certain patterns, or a combination thereof. In certain embodiments, the light emitting diode sheet may contain wiring embedded within and/or on the sheet that may be configured to connect with a power source to deliver power to the light emitting diodes of the light emitting diode sheet.

At step 1406, the method 1400 may include positioning a diffuser casing over a top portion of the core body until the diffuser casing contacts the bottom housing of the lighting device. In certain embodiments, the diffuser casing may have a hollow cavity that is sized and shaped to be positioned over the top portion of the core body. In certain embodiments, the diffuser casing may be positioned over a bottom portion of the core body until the diffuser casing contacts the top housing of the lighting device. In certain embodiments, the diffuser casing may be transparent, partially transparent, partially opaque, or a combination thereof. In certain embodiments, parts of the diffuser casing may be transparent while other parts may be partially transparent and/or opaque. In certain embodiments, the diffuser casing may enable diffusion of light emitted by the light emitting diodes of the light emitting diode sheet to facilitate the diffusion of light into an environment in 360 degrees. In certain embodiments, the diffuser casing may include patterns etched into the casing to adjust the manner in which light is diffused into the environment from the lighting device. In certain embodiments, the diffuser may be cylindrical or any other desired shape and may be made of plastic, glass, Teflon, and/or any other material.

At step 1408, the method 1400 may include securing a top housing of the lighting device to the top portion of the core body of the lighting device. For example, in certain embodiments, the top housing may have a locking groove configured to connect with a top groove or thread portion located at the top of the core body. In certain embodiments, if the core body has a thread portion (in certain embodiments may be a form of groove), the locking groove of the top housing may be positioned onto the thread portion and the top housing may be rotated until the top housing locks into place onto the top of the lighting device. In certain embodiments, if the core body has a groove (e.g., male groove or female groove), the top housing may have a complementary groove (e.g., if core body has a male groove the top housing may have a female groove and vice versa). In certain embodiments the groove of the core body may be secured to the groove of the top housing, such as via an interference fit. In certain embodiments, when the top housing is secured to the top of the core body, such action may facilitate keeping the diffuser casing in place between the top and bottom housings of the lighting device. In certain embodiments, the top housing may be cylindrical or any other desired shape and may correspond with the shape of the core body to which it is being attached.

At step 1410, the method 1400 may include positioning the hollow cavity of the core body of the lighting device over a portion of a tripod, mount, and/or other accessory. In certain embodiments, for example, the portion of the tripod, mount, and/or other accessory may be inserted into a cavity of the bottom housing which provides access to the cavity of the core body. One the portion of the tripod, mount, and/or other accessory is positioned within the cavity of the lighting device, the method 1400 may include, at step 1412, securing the lighting device to the portion of the tripod, mount, and/or other accessory. In certain embodiments, the lighting device may be secured to the portion of the tripod, mount, and/or other accessory, such as via a clamp or other securing device. In certain embodiments, the clamp may be separate from the lighting device, however, in certain embodiments, the clamp may be a part of the lighting device, such as on the side or the bottom of the bottom housing of the lighting device. At step 1414, the method 1400 may include activating the lighting device including the light emitting diode sheet. For example, a user may activate a switch of the lighting device to turn the plurality of light emitting diodes of the light emitting diode sheet on. In certain embodiments, the user may utilize another device to activate the lighting device, such as the first user device 1302 and/or the second user device 1311. For example, the first user device 1302 may have an application executing thereon that enables the user to select an option to activate or deactivate the lighting device. In certain embodiments, the first user device 1302 (or other device of system 1300) may be directly connected to the lighting device, such as via a USB or other cable (e.g., to an optional port of the lighting device), wirelessly connected such as via an optional communication module (e.g., Bluetooth module) of the lighting devices, and/or through other connection techniques.

Once the lighting device is activated, the plurality of light emitting diodes may be configured to emit light. In certain embodiments, the diffuser casing may be configured to diffuse the light so that the light emitted by the plurality of light emitting diodes of the light emitting diode sheet is scattered in a desired manner within an environment in which the lighting device is located. In certain embodiments, the diffuser casing may facilitate the scattering of light in the environment in 360 degrees outwards from the lighting device to facilitate high quality illumination of the environment and/or any objects in the environment. At step 1416, the method 1400 may include securing a camera, scanner, and/or other device to the lighting device. For example, the camera, scanner, and/or other device may be secured to a top portion of the top housing of the lighting device, such as via a clamp, attachment, and/or other securing device. Also, at step 1416, the camera, scanner, and/or other device may be activated so that the camera may capture video, audio, and/or image content of the illuminated environment in the lens range of the camera, the laser scanner may emit a laser to generate the representation of the illuminated environment, and/or other device may capture content and/or measurements from the illuminated environment. For example, the environment may be the inside of a lower level of a ship or container or other environment in which illumination enhances the quality of content, measurements, and/or representations generated. Notably, the method 1400 may further incorporate any of the features and functionality described for the lighting device 100, the system 1300, the system 1500, any other lighting device described herein, any other method disclosed herein, or as otherwise described herein.

Referring now also to FIG. 15, at least a portion of the methodologies and techniques described with respect to the exemplary embodiments of the system 1300 can incorporate a machine, such as, but not limited to, computer system 1500, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 1300 by providing processing power to assist with processing loads experienced in the system 1300, by providing storage capacity for storing instructions or data traversing the system 1300, or by assisting with any other operations conducted by or within the system 100. As another example, the computer system 1500 may assist with obtaining content generated by cameras of the system 1300, generating representations facilitated by the laser scanners of the system 1300, activating and/or deactivating the lighting device 1370, communicating with the lighting device 1370, communicating with the cameras and/or laser scanners (e.g., first user device 1302 and/or second user device 1314), and/or performing any other operations of the system 1300.

In some embodiments, the machine may operate as a standalone device. In some embodiments, the machine may be connected (e.g., using communications network 1335, another network, or a combination thereof) to and assist with operations performed by other machines and systems, such as, but not limited to, the first user device 1302, the lighting device 1370, the second user device 1311, the server 1340, the server 1345, the server 1350, the database 1355, the server 1360, any other system, program, and/or device, or any combination thereof. The machine may be connected with any component in the system 1300. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1500 may include a processor 1502 (e.g., a central processing unit (CPU), a graphics processing unit (GPU, or both), a main memory 1504 and a static memory 1506, which communicate with each other via a bus 1508. The computer system 1500 may further include a video display unit 1510, which may be, but is not limited to, a liquid crystal display (LCD), a flat panel, a solid-state display, or a cathode ray tube (CRT). The computer system 1500 may include an input device 1512, such as, but not limited to, a keyboard, a cursor control device 1514, such as, but not limited to, a mouse, a disk drive unit 1516, a signal generation device 1518, such as, but not limited to, a speaker or remote control, and a network interface device 1520.

The disk drive unit 1516 may include a machine-readable medium 1522 on which is stored one or more sets of instructions 1524, such as, but not limited to, software embodying any one or more of the methodologies or functions described herein, including those methods illustrated above. The instructions 1524 may also reside, completely or at least partially, within the main memory 1504, the static memory 1506, or within the processor 1502, or a combination thereof, during execution thereof by the computer system 1500. The main memory 1504 and the processor 1502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1522 containing instructions 1524 so that a device connected to the communications network 1335, another network, or a combination thereof, can send or receive voice, video or data, and communicate over the communications network 1335, another network, or a combination thereof, using the instructions. The instructions 1524 may further be transmitted or received over the communications network 1335, another network, or a combination thereof, via the network interface device 1520.

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The “machine-readable medium,” “machine-readable device,” or “computer-readable device” may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure is not limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A lighting device, comprising:

a top housing comprising a first top housing groove;

a bottom housing comprising a first bottom housing groove;

a core body comprising:

a first core body groove on a top portion of the core body configured to secure to the first top housing groove of the top housing based on engagement of the first core body groove with the first top housing groove and rotation of the top housing relative to the core body until the first top housing groove and the first core body groove lock; and a second core body groove on a bottom portion of the core body configured to secure to the first bottom housing groove of the bottom housing;

a hollow cavity extending within the core body; and a light emitting diode sheet configured to wrap around a portion of the core body, wherein the light emitting diode sheet comprises a plurality of light emitting diodes and is configured to emit light in a plurality of directions; and a diffuser casing configured to cover the light emitting diode sheet and configured to be secured to the lighting device between the top housing and the bottom housing.

2. The lighting device of claim 1, wherein the hollow cavity of the core body is accessible via an opening of the bottom housing and is configured to receive a portion of a tripod or a camera mount to secure the tripod or the camera to the lighting device.

3. The lighting device of claim 1, wherein the lighting device, the top housing, the bottom housing, the diffuser casing, or a combination thereof, are cylindrical.

4. The lighting device of claim 1, wherein the top housing comprises a screw opening positioned on a side surface of the first top housing groove that is configured to receive a screw to secure the top housing to the core body after the first core body groove on the top portion of the core body is secured to the first top housing groove of the top housing.

5. The lighting device of claim 1, wherein the bottom housing comprises a screw opening configured to receive a screw to secure the bottom housing to the core body after the second core body groove on the bottom portion of the core body is secured to the first bottom housing groove of the bottom housing.

6. The lighting device of claim 1, wherein the top housing comprises a second top housing groove located on an opposite end of the top housing from the first top housing groove and configured to lock with a different bottom housing groove of a different bottom housing of a different lighting device to form a combined lighting device including the lighting device and the different lighting device.

7. The lighting device of claim 6, wherein the lighting device and the different lighting device are further connected via a male-to-male connector configured to connect to a first power supply of the lighting device and a second power supply of the different lighting device.

8. The lighting device of claim 1, further comprising:

a power adapter assembly contained in the top housing and configured to deliver power to the light emitting diode sheet to cause the plurality of light emitting diodes to emit the light in the plurality of directions.

9. The lighting device of claim 1, further comprising:

a battery pack comprising to deliver power to the light emitting diode sheet to cause the plurality of light emitting diodes to emit the light in the plurality of directions.

10. The lighting device of claim 1, wherein the light emitting diode sheet is configured to conform to a shape of the core body when the light emitting diode sheet is wrapped around the portion of the core body.

11. The lighting device of claim 1, wherein the lighting device comprise a clamp configured to adjust a height at which the lighting device positioned relative to a tripod or a camera mount secured to the lighting device.

12. The lighting device of claim 1, wherein the diffuser casing is configured to diffuse the light emitted by the plurality of light emitting diodes of the light emitting diode sheet.

13. The lighting device of claim 1, wherein the core body comprises aluminum and the diffuser casing comprises plastic.

14. A lighting device system, comprising:

a lighting device, comprising:

a top housing comprising a first top housing groove;

a bottom housing comprising a first bottom housing groove;

a core body comprising:

a first core body groove on a top portion of the core body configured to secure to the first top housing groove of the top housing based on engagement of the first core body groove with the first top housing groove and rotation of the top housing relative to the core body until the first top housing groove and the first core body groove lock; and a second core body groove on a bottom portion of the core body configured to secure to the first bottom housing groove of the bottom housing; and a hollow cavity extending within the core body; and a light emitting diode sheet configured to wrap around a portion of the core body, wherein the light emitted diode sheet comprises a plurality of light emitting diodes and is configured to emit light in a plurality of directions; and a tripod or mount, wherein the hollow cavity of the core body is configured to be positioned over a portion of the tripod or mount; and a clamp configured to secure the tripod or mount to the lighting device after the hollow cavity of the core body is positioned over the portion of the tripod or mount.

15. The lighting device system of claim 14, further comprising a diffuser casing configured to cover the light emitting diode sheet and configured to be secured to the lighting device between the top housing and the bottom housing.

16. The lighting device system of claim 14, further comprising a power adapter assembly, a battery pack, or a combination thereof.

17. The lighting device system of claim 14, further comprising a communication module configured to communicatively link to a computing device configured to activate the lighting device system, deactivate the lighting device system, control the lighting device system, or a combination thereof.

18. The lighting device system of claim 14, wherein the bottom housing comprises a bottom housing cavity configured to align with the hollow cavity of the core body when the bottom housing is secured to the core body, and wherein the bottom housing cavity is configured to be positioned over the portion of the tripod or mount.

19. The lighting device system of claim 14, further comprising another lighting device configured to attach to the lighting device to form a combined lighting device.

20. A method, comprising:

securing a bottom housing of a lighting device to a core body of the lighting device;

wrapping a light emitting diode sheet comprising a plurality of light emitting diodes around a surface of the core body;

positioning a diffuser casing over a top portion of the core body until the diffuser casing contacts the bottom housing of the lighting device;

securing a top housing of the lighting device to the top portion of the core body of the lighting device, wherein a core body groove on the top portion of the core body is configured to secure to a top housing groove of the top housing based on engagement of the core body groove with the top housing groove and rotation of the top housing relative to the core body until the top housing groove and the core body groove lock;

positioning a cavity of the lighting device over a portion of a tripod or mount;

securing the lighting device to the portion of the tripod or mount via a clamp;

activating the light emitting diode sheet such that the plurality of light emitting diodes emit light 360 degrees outwards from the core body of the lighting device; and generating content or scanning in an environment via a camera or scanner secured to the lighting device, the tripod or mount, or a combination thereof.

* * * * *